United States Patent [19]
Horiguchi

[11] Patent Number: 5,380,996
[45] Date of Patent: Jan. 10, 1995

[54] OPTICAL CARD RECORDING/REGENERATING METHOD AND APPARATUS FOR DRIVING OPTICAL CARD WITH RESPECT TO OPTICAL HEAD SO AS TO INCREASE OR DECREASE RELATIVE SPEED IN AT LEAST ONE OF ID DIVISIONS OF OPTICAL CARD

[75] Inventor: Toshio Horiguchi, Hachioji, Japan

[73] Assignee: Olympus Optical Co., Ltd., Tokyo, Japan

[21] Appl. No.: 86,904

[22] Filed: Jul. 7, 1993

[30] Foreign Application Priority Data

Jul. 10, 1992 [JP] Japan .................................. 4-183925

[51] Int. Cl.⁶ .............................................. G06K 13/00
[52] U.S. Cl. .................................. 235/475; 235/476; 235/479; 369/44.28
[58] Field of Search ..................... 369/44.28; 235/475, 235/476, 477, 479, 480

[56] References Cited

U.S. PATENT DOCUMENTS 5,083,301 1/1992 Matoba et al. .................... 369/44.28
5,105,072 4/1992 Saito et al. ........................ 235/476
5,298,730 3/1994 Rokutan .............................. 235/476

FOREIGN PATENT DOCUMENTS 102475 5/1987 Japan .................................... 235/476
43849 2/1989 Japan .................................... 235/475
4-170769 6/1992 Japan .

*Primary Examiner*—John Shepperd
*Attorney, Agent, or Firm*—Armstrong, Westerman, Hattori, McLeland & Naughton

[57] ABSTRACT

An optical card recording/regenerating apparatus performs at least either recording or regenerating while reciprocating an optical card with respect to an optical head. At this time, the apparatus drives the optical card so that the relative speed between the optical card and optical head will be constant over a data division of the optical card and part of ID divisions in the vicinities of both edges thereof. When the relative speed becomes constant, the apparatus performs at least either recording or regenerating. The apparatus offers a smaller drive length. This realizes downsizing of an optical recording/regenerating apparatus and reduction of an access time.

19 Claims, 10 Drawing Sheets

MOVING DIRECTION OF AN OPTICAL CARD

MOVING DIRECTION OF AN OPTICAL CARD

FIG. 14(a)
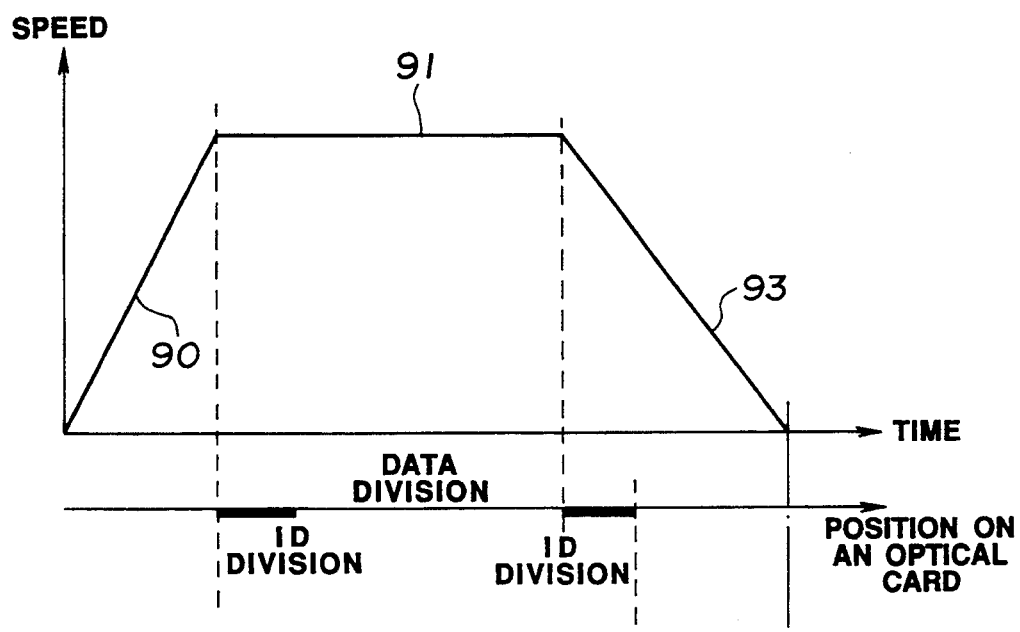
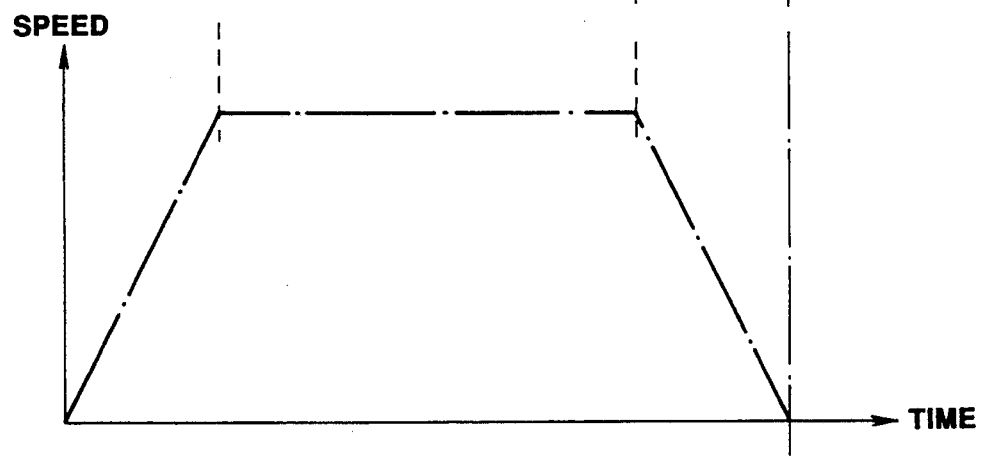
FIG. 14(b)   PRIOR ART

OPTICAL CARD RECORDING/REGENERATING METHOD AND APPARATUS FOR DRIVING OPTICAL CARD WITH RESPECT TO OPTICAL HEAD SO AS TO INCREASE OR DECREASE RELATIVE SPEED IN AT LEAST ONE OF ID DIVISIONS OF OPTICAL CARD

BACKGROUND OF THE INVENTION

1. Field of the Invention

The present invention relates to an optical card recording/regenerating apparatus for performing at least either information recording or regenerating on an optical card, and a recording/regenerating method for an optical card recording/regenerating apparatus.

2. Description of the Related Art and Prior Art

Optical cards have storage capacities that are several thousands to several ten thousands times larger than those magnetic cards have. The optical card is, however, unrewritable like a WORM optical disk. Nevertheless, because of the large storage capacity ranging from 2 to 3 megabytes, the uses as a health care card or an equivalent for storing past data of an admission history and a prepaid card, as well as the application for customer administration are under consideration. Experiments have already been taken up in some fields of applications.

In an optical card recording/regenerating apparatus which has been put to use, an optical card is reciprocated along tracks on an optical card in order to perform at least either recording or regenerating.

U.S. patent application Ser. No. 07/786,654 filed by the present applicant has disclosed an example of an optical card recording/regenerating apparatus. In the prior art, an optical card is loaded on an optical card base, the optical card base is reciprocated with respect to an optical head, and thus recording or regenerating is achieved. The reciprocation is performed over the data existent between ID divisions at both edges of the optical card in such a manner that the relative speed of a light beam irradiated from the optical head with respect to the optical card held on the optical card base will be constant. When the light beam is outside the ID divisions of the optical card, the relative speed between the light beam and the optical card is accelerated or decelerated.

In the card recording/regenerating apparatus, information recorded in the ID divisions and data division must be read stably and accurately (or to be written in the data division). While a light beam is accessing the ID divisions and data division, the relative speed of an optical card with respect to the light beam must be constant. In a conventional apparatus, the drive speed for an optical card is increased to become constant by the time when a light beam comes to an outer end of one of ID divisions formed in the vicinities of the edges of the card. In other words, a drive unit including a motor for driving an optical card base, which holds an optical card, not only drives the optical card at a constant speed from an outer end of one ID division to an outer end of the other ID division, but also accelerates or decelerates the optical card outside the ends of the ID divisions.

The larger the drive length (range) becomes, the bigger the drive unit grows. This results in a large-scale optical card recording/regenerating apparatus. When a voice coil motor is employed as the drive unit, the motor itself becomes large in size. A long drive length leads to a large access time.

If the space between ID divisions is narrowed, the drive length decreases. This realizes downsizing of the apparatus. However, the quantity of information to be recorded diminishes accordingly. This idea is therefore unacceptable.

The same address is sometimes recorded multiple times in the ID divisions so that track address information can be read out correctly and reliably. In this method, however, if the space between ID divisions is narrowed, the number of addresses that can be recorded decreases. The reliability of reading an address deteriorates.

A method is available, wherein an access time is reduced by increasing a driving acceleration. In this method, the apparatus by itself generates terrible vibrations and is susceptible to external vibrations or shocks.

OBJECTS AND SUMMARY OF THE INVENTION

An object of the present invention is to provide an optical card recording/regenerating apparatus in which downsizing can be realized and an access time can be reduced.

Another object of the present invention is to provide an optical card recording/regenerating apparatus in which vibrations generated by the apparatus itself can be limited.

Yet another object of the present invention is to provide an optical card recording/regenerating apparatus that is unsusceptible to external vibrations or shocks.

Still another object of the present invention is to provide an optical card recording/regenerating apparatus in which an access time can be reduced and track address information of an ID division can be identified reliably.

One preferred embodiment of the present invention comprises an optical head for optically performing at least either information recording or regenerating on an optical card having multiple tracks each of which includes ID divisions containing track address information in the vicinities of both ends thereof, and a data division between the ID divisions, a driving means for moving the optical card with respect to the optical head, and a control means for controlling the driving means so that the optical card will reciprocate with respect to the optical head, controlling the driving means so that the relative speed between the optical head and optical card will be constant over the data division through at least one of the ID divisions, and thus performing at least either information recording or regenerating.

Other features and advantages of the present invention will be fully apparent from the detailed description below.

BRIEF DESCRIPTION OF THE DRAWINGS

FIG. 14 is a graph showing the relationships between the drive speed for, time, and position an optical card relating to the third embodiment.

DETAILED DESCRIPTION OF THE PREFERRED EMBODIMENTS

Embodiments of the present invention will be described with reference to the drawings.

FIGS. 1 to 12 relate to the first embodiment of the present invention. The first embodiment will be described below.

Figure 2:
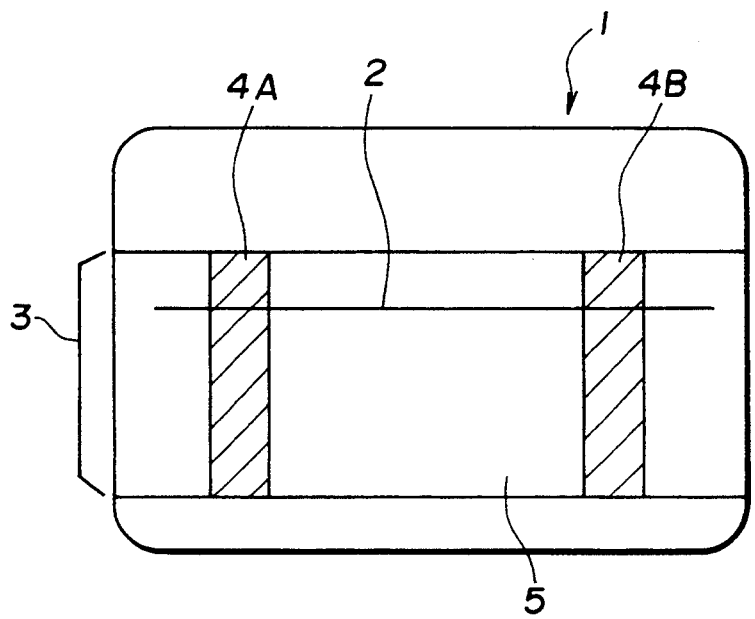
FIG. 2 is a constitutional diagram of an optical card.

FIG. 2 shows an optical card used in the embodiments described below. An optical card 1 has a track 2, which is formed in the longitudinal direction thereof, in a light recording field 3 thereof. The track 2 includes ID divisions 4A and 4B, in which track information of the track 2 is recorded, and a data division that lies between the ID divisions 4A and 4B and records user data. In the light recording field 3, a plurality of tracks 2 lie in parallel with one another. The ID divisions 4A and 4B are pre-recorded at the time of manufacturing the optical card 1. One of multiple predetermined sector formats is selected, and data is recorded in the data division 5 according to the selected format by a recording unit which will be mentioned later.

Figure 1:
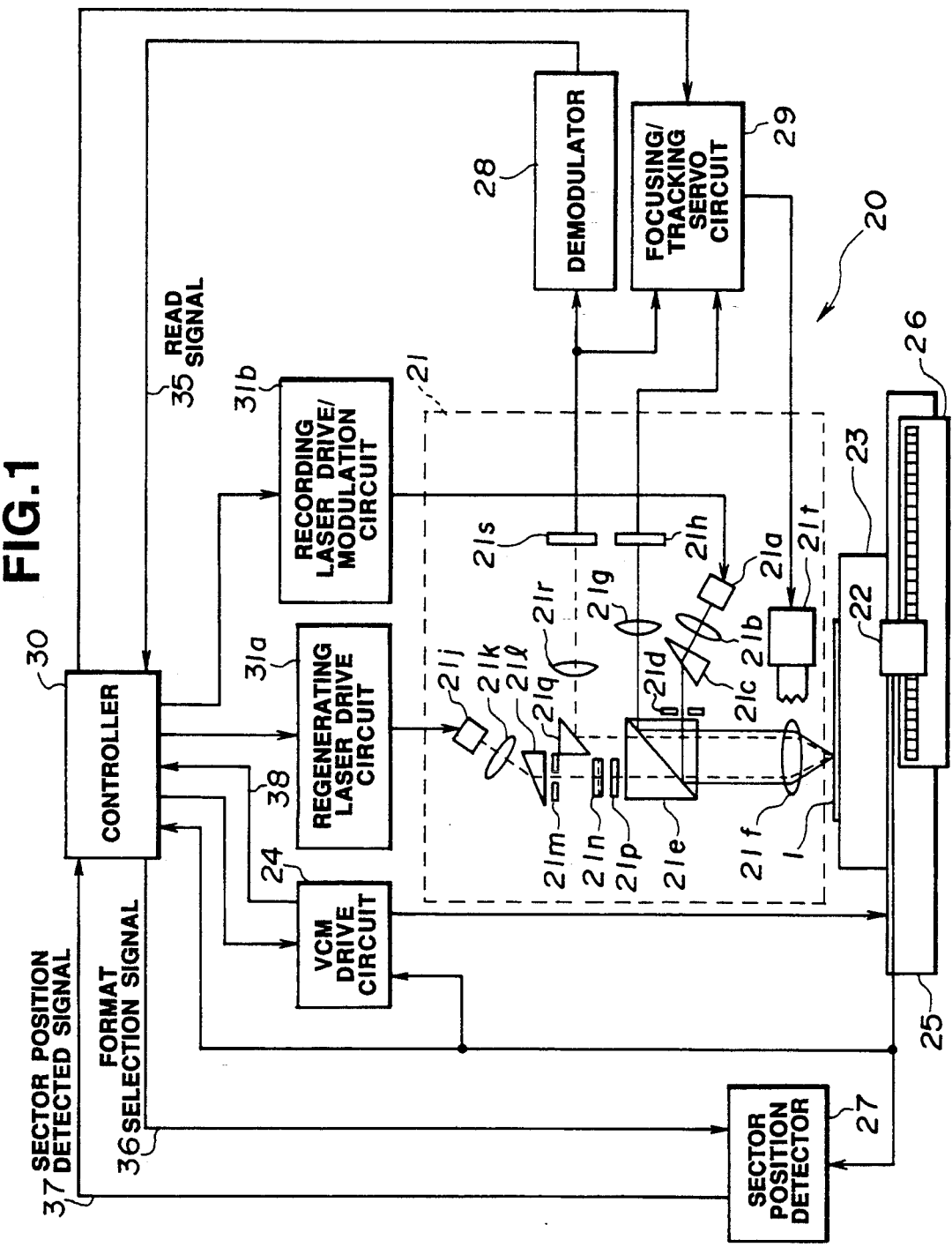
FIG. 1 is a block diagram of an optical card recording/regenerating apparatus.

FIG. 1 is a block diagram of an optical card recording/regenerating apparatus of the present invention. An optical card recording/regenerating apparatus 20 moves an optical card i along tracks. The optical card recording/regenerating apparatus 20 also moves an optical head 21 across tracks using an optical head drive motor which is not shown, thus performing data recording or regenerating.

The optical card 1 is mounted at a specified position on a shuttle 23 that is united with a movable coil of a voice coil motor (hereinafter, abbreviated as VCM) 25 to constitute a driving means. The optical card 1 is then reciprocated along tracks when driven by the VCM 25 serving as a driving means under the control of a VCM drive circuit 24 serving as a control means. The shuttle 23 is provided with an encoder 22 serving as a length detecting means for detecting a position of the optical card 1 with respect to the optical head 21. The encoder 22 supplies the position information detected using a linear scale 26 fixed to the VCM 25 or the bottom plate of the apparatus, which is not shown, to the VCM drive circuit 24, a sector position detector 27, and a controller 30 for controlling the operations of the entire apparatus.

The linear scale 26 should output pulses in pitches of, for example 50 micrometers so that a position along tracks on an optical card can be detected.

A recording light beam generated by a semiconductor laser (LD) 21a on an optical head 21 becomes a substantially elliptic beam of parallel rays after passing through a collimation lens 21b. The beam of parallel rays is reduced in the major-axis direction of the ellipse by a shaping prism 21c and shaped like a circle. The beam of parallel rays is further reduced in diameter so that the recording light beam will provide a specified spot size by a circular diaphragm 21d. The circular beam with a reduced diameter consists mainly of S-polarized components, which is a characteristic of a semiconductor laser. The circular beam is therefore reflected almost completely from the reflector of a polarizing beam splitter 21e, and enters an objective lens 21f. The light is converged on the optical card 1 by half of the objective lens 21f, thus producing a circular light spot. The light spot locally intensifies the energy density of the optical card 1, which causes a thermal irreversible change in the recording layer of the optical card 1. A pit is then formed. Light reflected from the optical card 1 passes through another half of the objective lens 21f on the opposite side of the half thereof through which incident light passes, and enters an image formation lens 21g after reflected from the reflector of the polarizing beam splitter 21e. The reflected light then forms an image on a recording light focus detector 21h after passing through the image formation lens 21g. The foregoing optical system allows a recording light beam to enter a position decentered from the optical axis of the objective lens 21f, and thus performs what is referred to as "off-axis focus detection."

On the recording light focus detector 21h, for examples, a two-division light receiving element is arranged so as to detect the movement of an image of a recording light beam spot resulting from defocus. With the output of the two-division light receiving element, the defocus of a recording beam on an optical card can be detected.

On the other hand, a regenerating beam originates from a light source of a semiconductor laser 21j which is arranged independently of the semiconductor laser 21a for generating a recording beam, and becomes an elliptic beam of parallel rays after passing through a collimation lens 21k. The beam of parallel rays is enlarged in the minor-axis direction of the ellipse by a shaping prism 21l, and thus shaped like a circle. The shaped beam of parallel rays is reduced in diameter by a circular diaphragm 21m so that the regenerating beam will have a specified spot size. The circular beam of parallel rays enters a plano-concave cylindrical lens 21n, whereby only the portion of the circular beam oriented unidirectionally on the plane perpendicular to the optical axis thereof is refracted thereby. A beam diffusing slightly in the direction emerges. The beam is then divided into a beam of zero-order diffracted light and two beams of first-order diffracted light, totaling three beams, by a diffraction grating 21p. The direction in which light is diffused by the cylindrical lens 21n is substantially perpendicular to the direction in which light is diffracted by the diffraction grating 21p.

Figure 3:
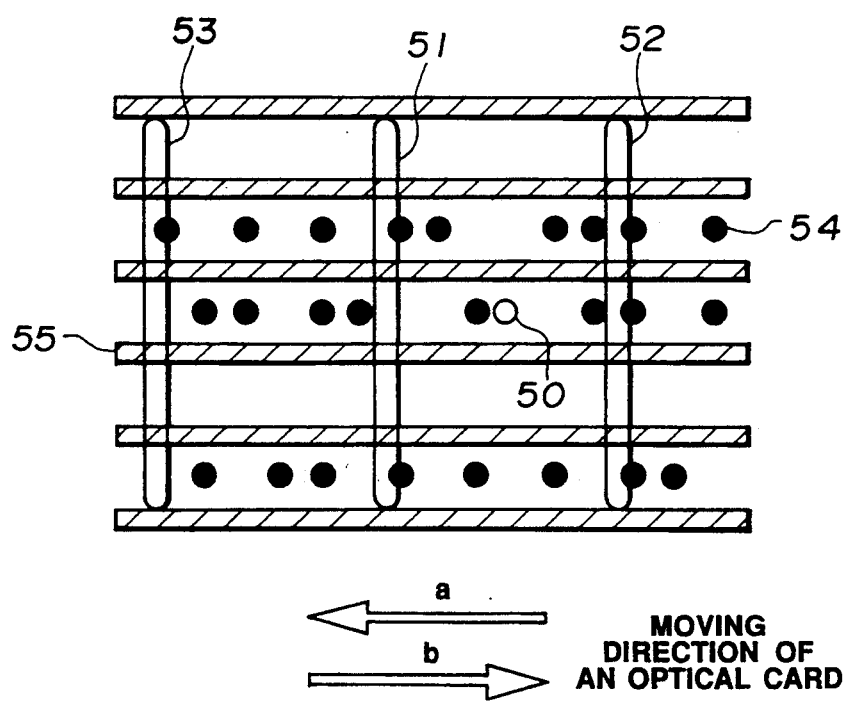
FIG. 3 is an explanatory diagram concerning the positions of recording and regenerating light beams on an optical card.

The beam divided into three beams by diffraction consists mainly of P-polarized components, which is a characteristic of a semiconductor laser. The beam is therefore transmitted almost completely by the polarizing beam splitter 21e, and enters the objective lens 21f at a position decentered from the optical axis thereof. The three beams of zero-order and ± first-order diffracted light are converged on the optical card 1 by the objective lens 21f, thus producing three elongated spots which are enlarged in a direction in which the beams are made diffusive by the cylindrical lens 21n. FIG. 3 shows a recording light spot 50, and spots 51, 52, and 53 formed by the beams of diffracted light of a regenerating light beam, which are present on the optical card 1. That is to say, these spots 51, 52, and 53 are the foregoing three light spots enlarged in the diffusing direction.

The relative positional relationships between the recording light spot and the regenerating light spots are defined so that the recording light beam spot 50 will be located between the spot 51 formed by the zero-order diffracted light of the regenerating light beam, and one of the two first-order diffracted light spots 52 and 53. The layout of light spots is adjusted by differing an angle of a recording light beam before entering the objective lens 21f with respect to the optical axis of the objective lens 21f from an angle of a regenerating light beam with respect to the optical axis thereof.

The direction in which the cylindrical lens 21n refracts light is, as shown in FIG. 3, the direction in which the regenerating beam spots 51, 52, and 53 are enlarged; that is, a direction substantially perpendicular to track guides on an optical recording medium. This is intended to acquire information from multiple tracks of the optical recording medium simultaneously.

The spots 51, 52, and 53 formed by the diffracted light of a regenerating light beam are reflected regularly with the quantities of light modulated according to the presence or absence of a track guide 55 and a pit 54 on an optical card. The reflected light passes through the objective lens 21f from the reverse side of the objective lens 21f, and enters the polarizing beam splitter 21e in the form of substantially parallel rays. The reflected light is characteristic of P-polarization due to regular reflection, transmitted almost completely by the polarizing beam splitter 21e, and then routed to a regenerating light condenser 21r via a reflecting mirror 21q. Light converged by the regenerating light condenser 21r is enlarged and projected on the light receiving surface of a photodetector 21s to form the images of the spots on the optical card.

Figure 4:
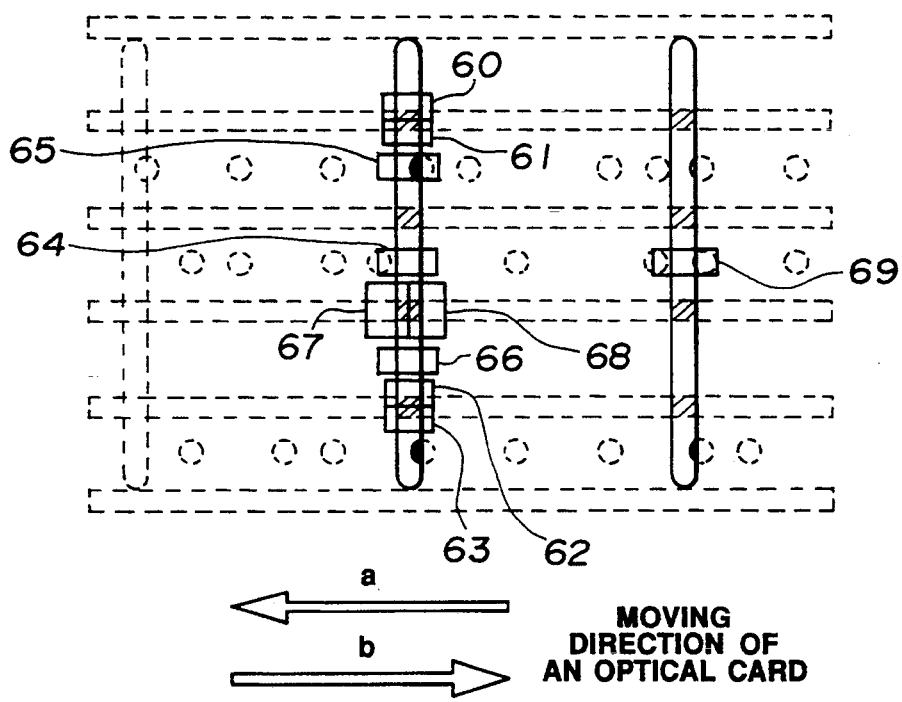
FIG. 4 is an explanatory diagram for spot images of a regenerating light beam projected on a photodetector.

FIG. 4 shows spot images formed by zero-order and first-order diffracted light of a regenerating light beam which are projected on the photodetector 21s. Light receiving elements for regenerating 64, 65, 66, and 69, light receiving elements for tracking 60, 61, 62, and 63, and light receiving elements for regenerating light focusing 67 and 68 are arranged on the photodetector 21s. The spot images of regenerating light are formed at appropriate positions on these light receiving elements without causing either off-track formation or defocus.

A change in quantity of light received by the tracking light receiving elements 60 and 61, or 62 and 63 is detected as a positional change of an image of a track guide resulting from off-track formation, thus enabling production of a tracking error signal. A difference in output between the regenerating light focusing light receiving elements 67 and 68 is detected as a displacement of a regenerating light beam resulting from defocus. A focus error signal is produced according to the difference in output between the light receiving elements 67 and 68.

During regenerating, the presence or absence of a pit in each of three tracks is detected as a change in quantity of light received by each of the regenerating light receiving elements 64, 65, and 66. A regenerative signal is then output. In other words, the information of three tracks is regenerated simultaneously.

Figure 5:
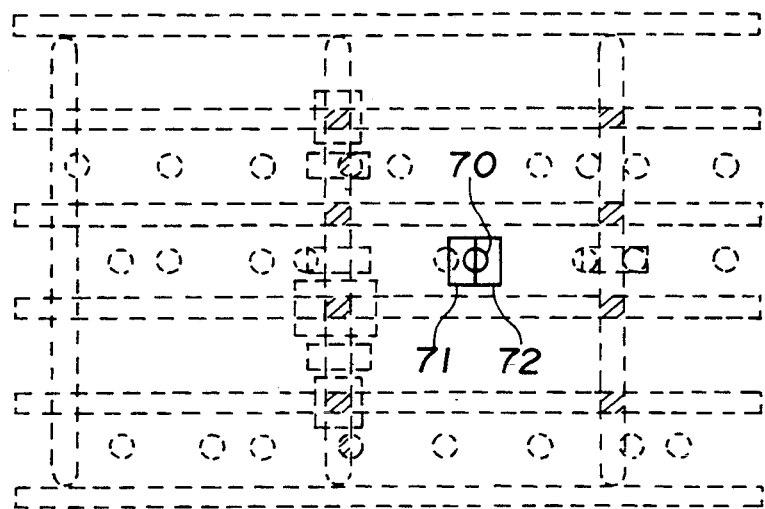
FIG. 5 is an explanatory diagram for a spot image of a recording light beam projected on a focus detection photodetector.

FIG. 5 shows a spot image 70 of a recording light beam projected on a photodetector for recording focus detection 21h. Light receiving elements for recording light focusing 71 and 72 are arranged on the photodetector 21h. The spot image 70 of recording light is formed at an appropriate position on these light receiving elements in a state free from off-track formation and defocus. A difference in output between the light receiving elements for recording light focusing 71 and 72 is detected as a displacement of a recording light beam resulting from defocus, thus enabling production of a recording focus error signal.

Light emission of the recording semiconductor laser 21a is controlled by recording laser drive/modulation circuit 31b under the control of the controller 30 for controlling the operations of the entire apparatus. Light emission of the regenerating semiconductor laser 21j is controlled by a regenerating laser drive circuit 31a similarly. When data is to be recorded in the optical card 1, the recording laser drive/modulation circuit 31b modulates the output power of the recording semiconductor laser 21a according to the record data under the control of the controller 30.

The outputs of the photodetectors 21h and 21s are fed to a focusing/tracking servo circuit 29. The focusing/tracking servo circuit 29 drives an objective actuator 21t in focusing and tracking directions so that respective light beam spots will follow the associated tracks on the optical card 1 while being in focus in the centers of the tracks.

In this embodiment, a focus error signal is provided by either the photodetector 21h or 21s. One of the photodetectors 21h and 21s may be used for adjustment during assembly, and the other one may be used for general operation. Alternatively, either the photodetector 21h or 21s may be selected depending on whether recording or regenerating is performed.

The output of the photodetector 21s is supplied to a demodulator 28 constituting a reading means, thus producing a read signal 35. The read signal 35 is supplied to the controller 30. The controller 30 detects a data regenerative signal or track address information in the read signal 35.

The sector position detector 27 outputs a sector position detected signal 37 when the optical head comes to a position on an optical card corresponding to a border of a sector. Since an optical card is available in various formats, the sector position detector 27 detects a sector position according to a sector format selected with the format selection signal 36 sent from the controller 30.

Figure 6:
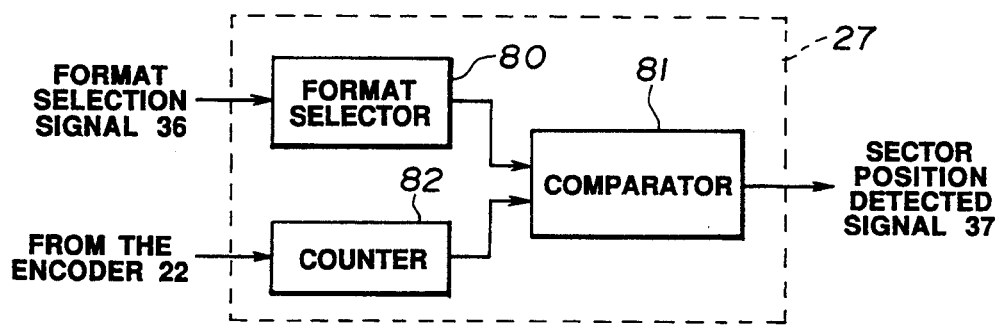
FIG. 6 is a block diagram showing an example of a circuitry of a sector position detector.

FIG. 6 shows an example of a circuitry of a sector position detector. The sector position detector 27 includes a format selector 80 for outputting a specified value representing a border position of a sector on an optical card to a comparator 81 according to an input format selection signal 36 and a counter 82 for counting output signals sent from the encoder 22. The sector position detector 27 further includes a comparator 81 for comparing a count value provided by the counter 82 with a specified value provided by the format selector 80, and outputting a sector position detected signal 37 when the count value and specified value are consistent with each other.

For example, when a sector format for recording three sectors in one track is selected, the left ends of the sectors are located 4.95, 23.65, and 42.35 mm away from the left end of the left ID division. Assuming that the output pitch of the encoder 22 is 50 micrometers, after the counter 82 is reset at the left end of the ID division, when the output of the counter 82 represents 99, 473, and 847, the sector position detected signal 37 is output.

A point at which the counter 82 is reset is not limited to the foregoing position. The counter 82 may be reset at any point that can serve as a reference position of the optical card i with respect to the optical head 21 (for example, an edge of an optical card, and a specified position within a pre-recorded ID division).

The sector position detected signal 37 is output to the controller 30. The controller 30 counts up the signals 37 to determine an intended sector. Alternatively, this kind of counter may be installed in the sector position detector 27 and the output of the counter may be supplied as a sector number to the controller 30.

Next, the operations of the optical card recording-/regenerating apparatus 20 in the first embodiment will be described.

Figure 7A:
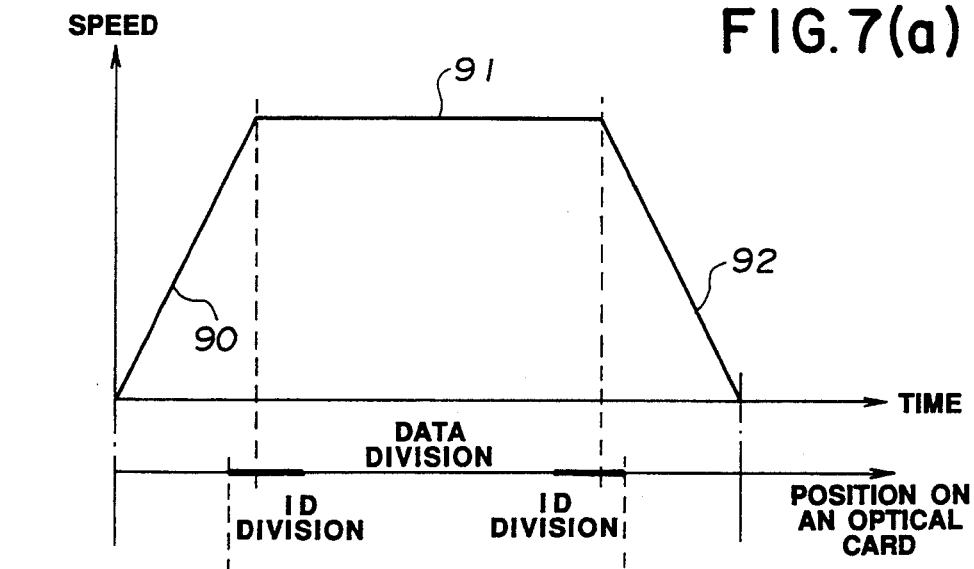
FIG. 7 is a graph showing the relationships between the drive speed, time, and position concerning an optical card.
Figure 7B:
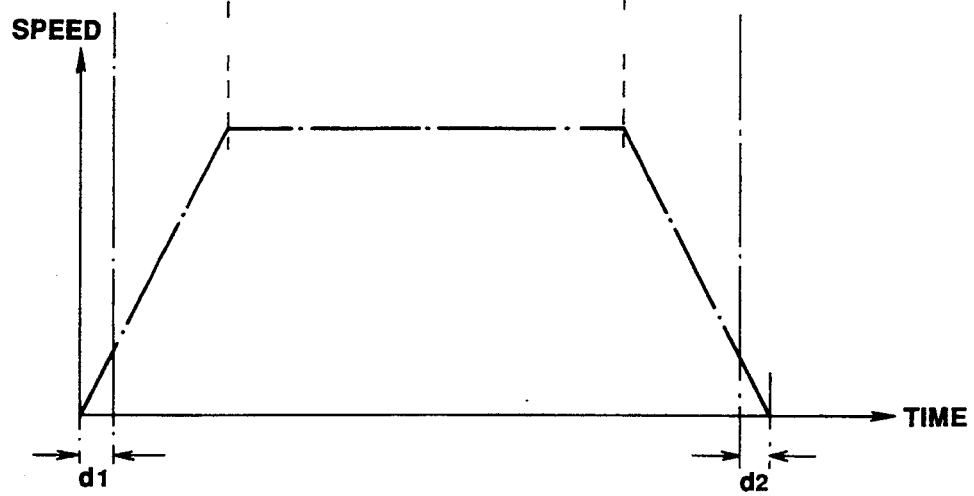

In this embodiment, the VCM 25 is used to reciprocate the optical card 1 loaded on the shuttle 23 along tracks, and thus recording or regenerating is carried out. FIG. 7a shows a drive pattern according to which the optical card 1 is driven once. In FIG. 7a, the axis of ordinates represents the relative speed between an optical card and an optical head, and the axis of abscissas represents the time and position of the optical head on the optical card. Reference numeral 90 denotes a duration (hereinafter, accelerating duration) during which the moving speed increases to start up an optical card which is at a halt. Reference numeral 91 denotes a duration (hereinafter, constant-speed duration) during which the relative speed is constant. Reference numeral 92 denotes a duration (hereinafter, decelerating duration) during which the moving speed decelerates to stop the optical card.

In the apparatus of this embodiment, the optical card 1 is driven so that when the optical head 21 passes through two ID divisions, part of these ID divisions will be in the accelerating or decelerating duration of optical card reciprocation. Specifically, during the accelerating duration, before the drive speed for the optical card 1 becomes constant, the optical head 21 or light spot reaches an ID division. During the decelerating duration, while the light spot is lying in an ID division, the drive speed for the optical card starts decreasing. Compared with a conventional operation pattern indicated with a dot-dash line in FIG. 7b, the pattern in this embodiment allows the apparatus to drive an optical card for a period of time that is shorter by a sum of d1 and d2. A length the apparatus of this embodiment has to drive an optical card becomes therefore smaller. This enables downsizing of an optical recording/regenerating apparatus.

A data recording/regenerating method for driving an optical card according to the pattern in FIG. 7a will be described below. The recording/regenerating method for the data division 5 is identical to a conventional one because the relative speed is constant like the one according to the conventional drive pattern.

Next, a method of regenerating an ID division will be described according to the flowchart of FIG. 9. An optical card 1 stands still initially. A light beam from the optical head 21 is positioned at the left edge of the optical card 1. At this stage, the controller 30 has identified a track number of a track in the optical card 1 on which the light beam is focused. At a step S1, it is determined whether an intended track to be accessed agrees with a current track. If they disagree with each other, the optical head 21 is moved across tracks on the optical card 1 at a step S2, and thus shifted to the intended track. A length by which the optical head 21 is moved may be measured using a linear scale which is not shown. Alternatively, the number of track guides crossed by a moving light beam, which originates from a light source in the optical head 21, may be counted using light reflected from the optical card 20.

When the optical head 21 reaches the intended track on the optical card 1, the controller 30 outputs an instruction or a signal to the VCM drive circuit 24 in order to drive the optical card i along tracks. In response to the instruction or signal, the VCM drive circuit 24 flows current through the coil in the VCM 25. The coil in the VCM 25 is provided with the shuttle 23. The optical card 21 loaded on the shutter 23 is driven along tracks (step S3).

The VCM drive circuit 24 detects the speed and position of the shuttle 23 in the output of the encoder 22 mounted on the shuttle 23. A difference of the speed of the shuttle 23 from a predetermined speed is detected at every position of the shuttle 23. Driving voltage to be applied to the VCM 25 is controlled so that the difference will be zero. Since the shuttle 23 is at a halt initially, driving voltage is applied to the coil in the VCM 25 in steps. The shuttle 23 then starts accelerating as shown in FIG. 7a. Predetermined target speeds are stored in association with positions of the shuttle 23 in the VCM drive circuit 24. Servo control is based on the stored data of target speeds, whereby the speed of the shuttle 23 becomes constant substantially at a specified position. The controller 30 counts outputs of the encoder 22 mounted on the shuttle 23, and waits until it detects that the light beam irradiated from the optical head 21 to the optical card i has reached the position of the ID at the left edge of the optical card 1 (step S4).

Even when the light beam reaches the position of the ID, as shown in FIG. 7a, the speed of the shuttle 23 has not become constant. The controller 30 therefore does not read data from the optical card 1. The VCM drive circuit 24 measures the speed of the shuttle 23 by counting the outputs of the encoder 22. When the measured speed reaches a constant speed (or a speed slightly lower than a constant speed), a signal 38 meaning that the shuttle speed has reached the constant speed is supplied to the controller 30. The controller 30 waits for the signal 38 (step S5), and then reads data from the optical card 1.

The data on the optical card 1, similarly to the data on an optical disk, are recorded according to a modulation rule of a self-clock system; such as, modified frequency modulation or 2-7 conversion. For reading or writing the data, the optical card i must be driven at a constant speed. After the driving speed of the optical card 1 becomes the constant speed, data is read from the ID division at a step S6. The operation of the step S6 will be detailed later. Address information of each track of the optical card 1 is pre-recorded in the ID division. Data is read from the ID division to see if the track is an intended track (step S7). If it is not an intended track, driving the optical card 1 is terminated. The controller then waits for the light beam to reach the other edge of the optical card 1 (step S8). Thereafter, the controller returns to the step S2, moves the optical head 21 across tracks, and thus shifts the light beam to the intended track.

If the track is the intended track, data is read or written from or in the data division at a step S9. When access to the data division 5 terminates, the position of the light beam is identified by counting the outputs of the encoder 22. The controller then waits for the light beam to reach a position at which decelerating the shuttle 23 is started (step S10). A position at which decelerating the shuttle 23 is started is, as shown in FIG. 7a, a position at which the light beam still lies in the ID division on the right side of the optical card 1. The position may be any point within the ID division. Conventionally, the shuttle 23 is decelerated after the light beam passes through an ID division. In this embodiment, after access to the data division 5 terminates, the optical card 1 needs not be driven at the constant speed. However, since the optical card 1 may be accessed in the opposite direction of the direction described above; that is, from the right side in FIG. 7a, either a length required to decelerate the optical card 1 from a constant speed or a length required to accelerate the optical card 1, which is in a still state, to the constant speed, whichever is larger, should preferably be used as a length defining both the accelerating and decelerating durations. At a step S11, the shuttle 23 on which the optical card 1 is loaded is decelerated and stopped at a specified position.

Figure 8:
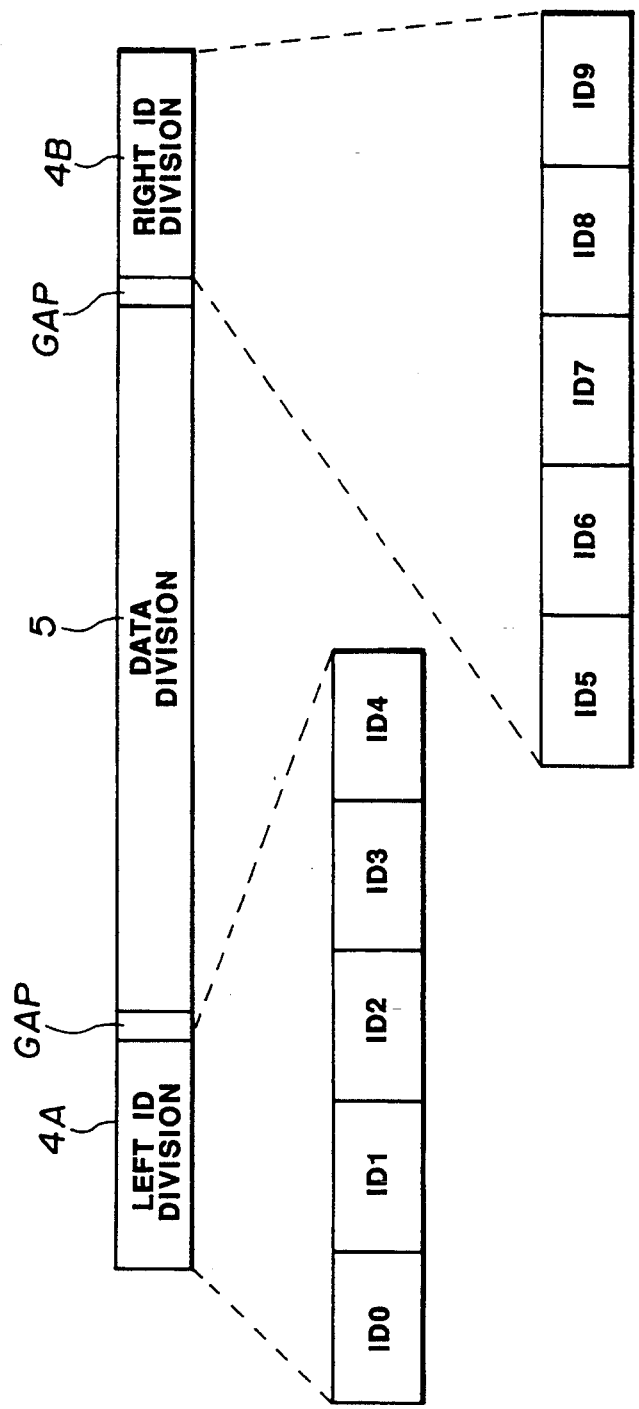
FIG. 8 is an explanatory diagram showing an example of a format of a track on an optical card.

Next, a method of reading an ID division at the step S6 will be described. FIG. 8 shows an example of a format of a single track on the optical card 1 for use in this embodiment. The track comprises ID divisions (left ID division 4A and right ID division 4B) formed at both ends thereof, and a data division 5 interposed between the ID divisions. The left ID division consists of ID0 to ID4. The right ID division 4B consists of ID5 to ID9. A gap for absorbing a speed variation is created between the left ID division 4A and data division 5, and between the right ID division 4B and data division 5. Each of ID0 to ID4, and ID5 to ID9 comprises data indicating an ID number, address information (track number) of the track, and an error correction code. In other words, errors in ID0 to ID9 can be corrected independently of one another and address information can be read from ID0 to ID9 independently of one another. However, a code having a large quantity of data cannot be adopted as the error correction code. Error correction can therefore be done for ID0 to ID4 in the left ID division 4A, and for ID5 to ID9 in the right ID division 4B. A track number is regarded as correct only when found consistent in more than three ID fields.

In this embodiment, when the optical card 1 accelerates, before the speed of the optical card 1 with respect to a light beam becomes constant, the light beam comes to an ID division. Immediately before the speed becomes constant, the light beam is set at a position between ID1 and ID2 or within ID1 in FIG. 8. In the fields of ID0 and ID1, the drive speed for the optical card 1 is not constant. Stable regeneration is therefore impossible. On the other hand, in the fields of ID2 to ID4, the drive speed is constant. Three IDs of ID2 to ID4 are therefore regenerated stably. In this embodiment, as shown in FIG. 1, three tracks are illuminated simultaneously. A total of nine IDs resulting from 3 IDs by 3 tracks can be regenerated with a single operation of moving an optical card.

Figure 10:
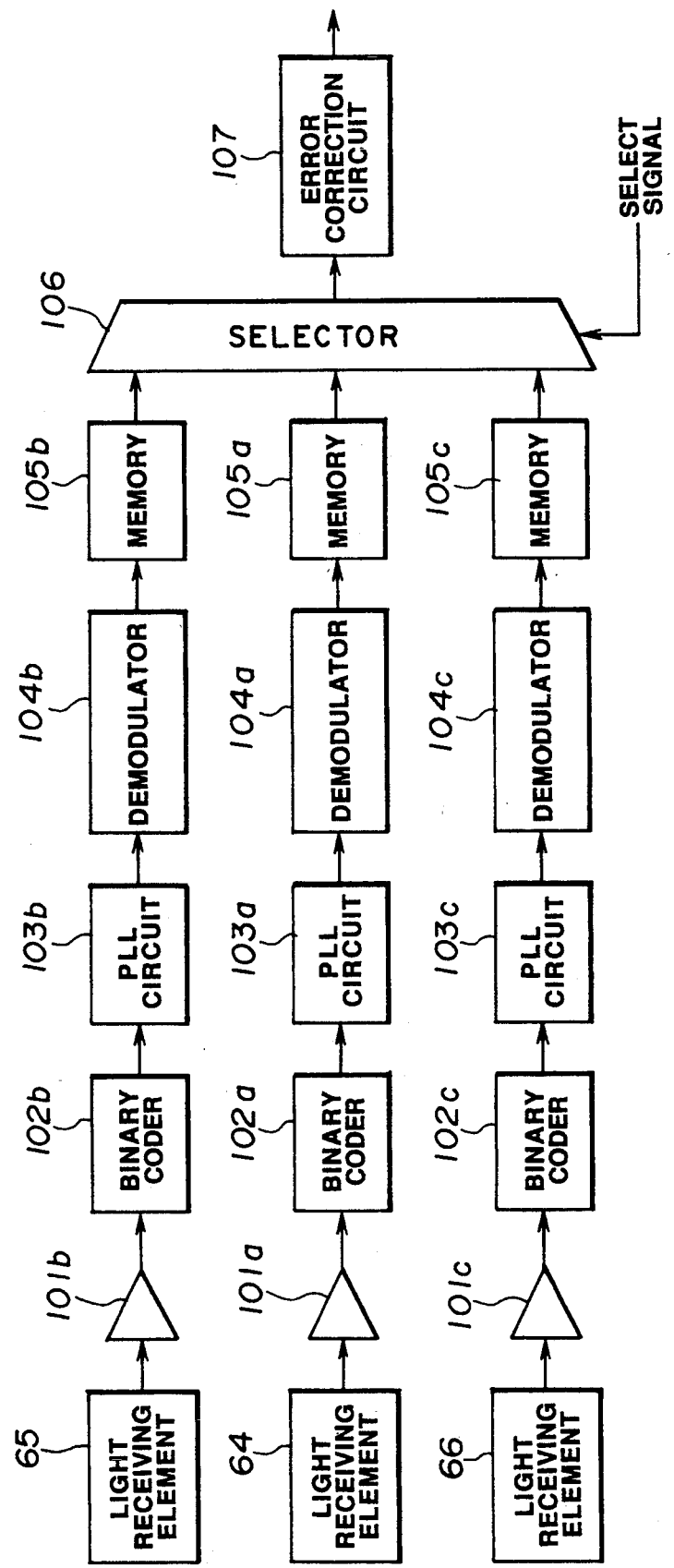
FIG. 10 is a block diagram showing an example of a constitution of the demodulator shown in FIG. 1.

FIG. 10 is a block diagram of the demodulator 28 shown in FIG. 1. Reference numerals 64, 65, and 66 denote the light receiving elements shown in FIG. 4. An electric signal provided by the light receiving element 64 is amplified by an amplifier 101a, and then converted into a binary-coded signal by a binary coder 102a. The binary-coded signal is input to a phase locked loop (PLL) circuit 103a, and converted into a bit synchronizing signal. The bit synchronizing signal is then input to a demodulator 104a. The demodulator 104a produces a data modulated signal according to the bit synchronizing signal, and stores the result in a memory 105a. The output signals of the other two light receiving elements 65 and 66 are converted similarly. The data demodulated signals resulting from the conversion are stored in memories 105b and 105c. The controller 30 outputs a select signal to a selector 106, thus specifying the contents of which memory should be used. Select signals are sequentially fed to an error correction circuit 107 for error correction. The results are stored in a memory, which is not shown, in the controller 30.

Assuming that each of the memories 105a, 105b, and 105c stores, as described above, the regenerated data of ID2 to ID4 in an associated track, a method of determining a track number will be described according to the flowchart of FIGS. 11 and 12. It is assumed that the light receiving element 64 reads data from a track n, the light receiving element 65 reads data from a track n−1, and the light receiving element 66 reads data from a track n+1.

Figure 11:
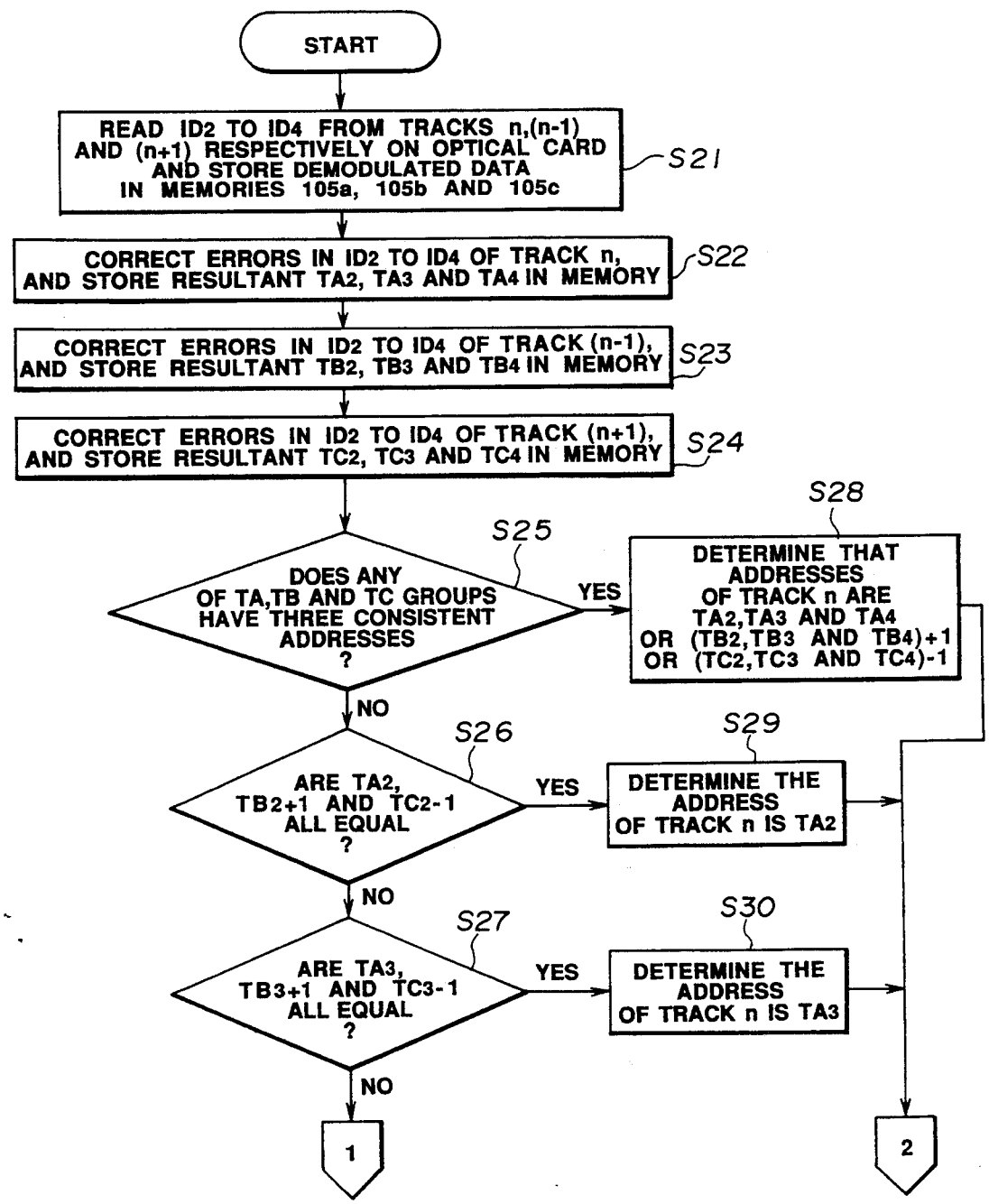
FIG. 11 is a flowchart concerning a method of determining a track number.

To begin with, at a step S21 of FIG. 11, ID2s to ID4s of three tracks are read from the optical card 1 simultaneously, and the demodulated data are stored in the memories 105a, 105b, and 105c. At a step S22, the demodulated data stored in the memory 105a is read to correct an error. Track addresses resulting from the error correction are stored as TA2, TA3, and TA4 in a memory in the controller 30 serving as a determining means. Subsequently, at steps S23 and 24, the demodulated data existent in the memories 105b and 105c are read to correct errors. Track addresses resulting from the error correction are stored as TB2, TB3, and TB4, and TC2, TC3, and TC4 in the memory in the controller 30.

At a step S25, the controller 30 checks if any set of TA2, TA3, and TA4, TB2, TB3, and TB4, and TC2, TC3, and TC4 are all consistent. If any set is all consistent, the controller passes to a step S28 and determines an address of the track n on the basis of the set having all consistent addresses. For example, if TA2, TA3, and TA4 are all consistent, the controller 30 determines that the address of the track n is TA2. If TB2, TB3, and TB4 are all consistent, the controller determines that the address of the track n is TB2+1. If no set has all consistent addresses, the controller 30 advances to a step S26. At the step S26, the controller 30 checks if TA2, TB2+1, and TC2−1 are all equal. If all are consistent, the controller 30 passes to a step S29, and determines that the address of the track n is TA2.

If all are inconsistent, the controller 30 passes to a step S27. At the step S27, the controller 30 checks if TA3, TB3+1, and TC3−1 are all equal. If all are consistent, the controller 30 passes to a step S30, and determines that the address of the track n is TA3. If all are inconsistent, the controller passes to a step S31 in FIG. 12, and checks if TA4, TB4+1, and TB4−1 are all equal. If all are consistent, the controller passes to a step S32, and determines that the address of the track n is TA4. If all are inconsistent, the controller 30 passes to a step S33 in FIG. 12, and concludes that reading an ID division fails. The processing then terminates.

Figure 9:
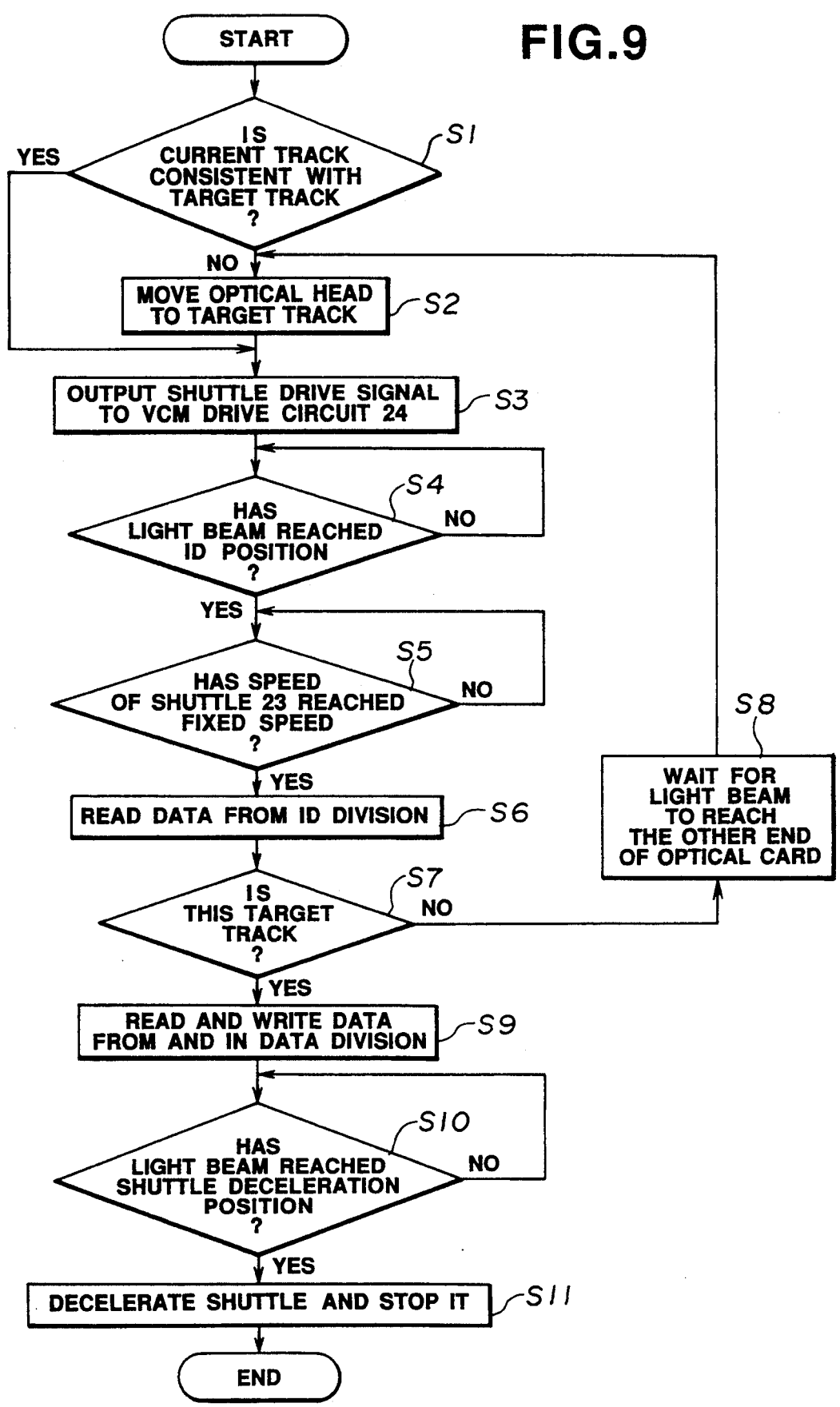
FIG. 9 is a flowchart relating to a method of regenerating an ID division.
Figure 12:
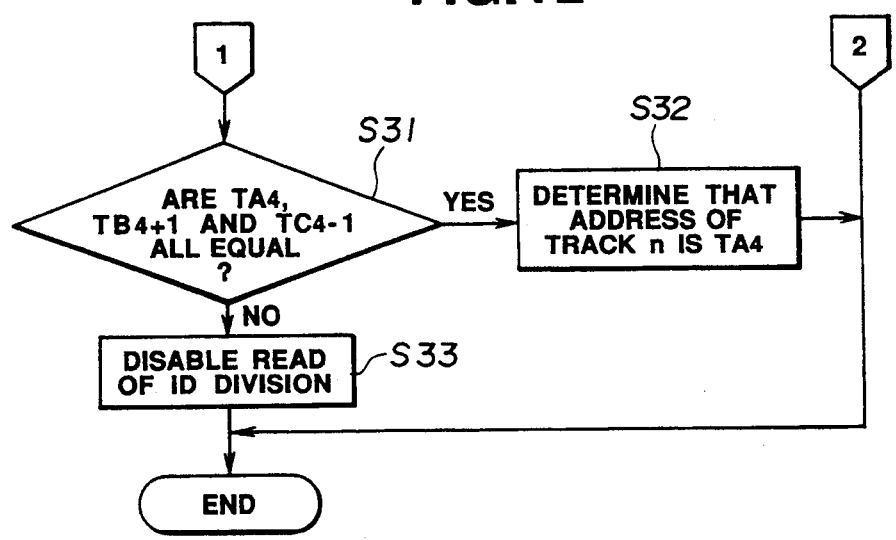
FIG. 12 is a flowchart succeeding FIG. 11.

If the address h of the track n can be determined at any of the steps S28, S29, and S30 in FIG. 11, and the step S32 in FIG. 12, subsequent processing is performed according to the flowchart of FIG. 9. In short, data reading or writing is carried out.

Since the optical card 1 is driven as mentioned above, the apparatus of this embodiment offers a smaller drive length for the optical card 1 than a conventional driving method does. The apparatus of this embodiment therefore offers a shorter access time in accessing the optical card 1, and enables downsizing of the VCM 25. Eventually, the entire optical card recording/regenerating apparatus becomes smaller in size. Furthermore, this embodiment enables reduction in manufacturing cost of an optical card recording/regenerating apparatus.

This embodiment identifies a track address by checking track addresses of multiple tracks as shown in the flowchart of FIGS. 11 and 12. A track address can therefore be identified reliably.

In this embodiment, data are read from three tracks simultaneously. The number of tracks from which data are read may be more than three. A position at which the optical card 1 is controlled to move at a constant speed is set between ID1 and ID2 in an ID division, which may be set at any other point within the ID division. A position at which the optical card 1 starts decelerating may be set at any point within the ID division.

In the aforesaid embodiment, movement over a data division as well as part of ID divisions is controlled at a constant speed. Deceleration may start with the end of the data division. Even if one of the ID divisions is accessed similarly to that in the aforesaid prior art; that is, the movement over part of one of the ID divisions and the whole of the other ID division is controlled at a constant speed, the access time can still be shortened.

Next, the second embodiment of the present invention will be described.

Figure 13A:
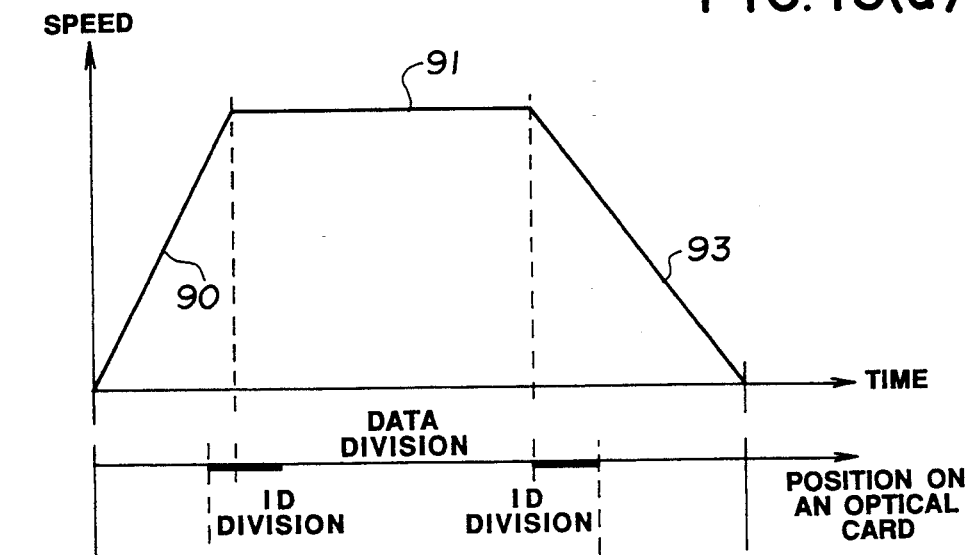
FIG. 13 is a graph showing the relationships between the drive speed, time, and position concerning an optical card relating to the second embodiment.
Figure 13B:
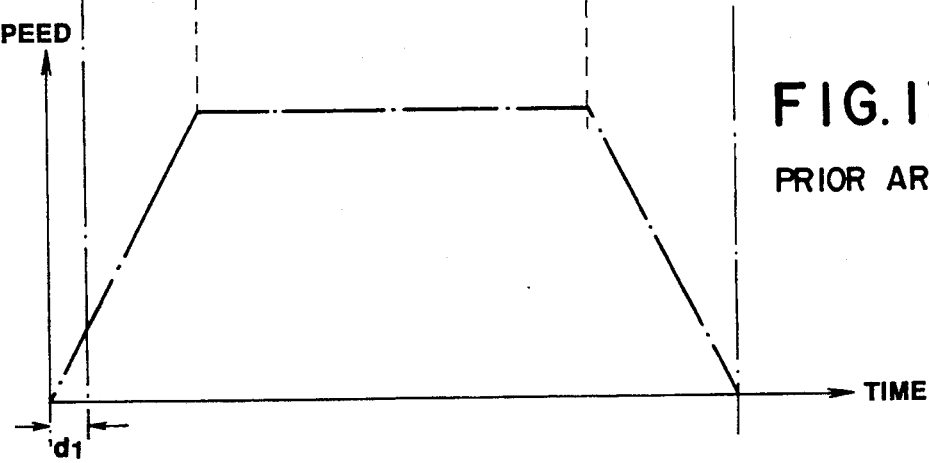

FIG. 13a shows a drive pattern in the second embodiment of the present invention according to which an optical card 1 is driven once. FIG. 13a shows, similarly to FIG. 7a, the time-passing transition of a drive speed. Portions identical to those in FIG. 7a bear the same numerals. What differs from the drive pattern shown in FIG. 7a is a position at which the optical card 1 moving at a constant speed starts decelerating. In the second embodiment, the optical card starts decelerating when passing through the data division 5. As indicated with reference numeral 93 in FIG. 13a, the optical card is decelerated at the rate of a slowing-down acceleration constant that is smaller than that in the first embodiment, and stopped at-the same position as that in the first embodiment. The stop position is the same as that in the first embodiment, because, for example, when the optical card 1 is driven in the right ID division 4B, a length is required to increase the speed of the optical card 1 up to a constant speed. Reading or writing the ID divisions and data division is identical to that in the first embodiment, of which description will therefore be omitted. FIG. 13b is, similarly to FIG. 7b, an explanatory diagram showing a conventional operation pattern for comparison.

Since the optical card 1 is driven as mentioned above, an apparatus of this embodiment offers a smaller slowing-down acceleration constant at the rate of which the optical card 1 is decelerated from a constant speed. The apparatus is therefore unsusceptible to external vibrations or shocks applied during deceleration, and generates less vibrations. In short, the present invention offers a smaller speeding-up or slowing-down acceleration constant depending on a position at which a constant speed is attained after acceleration or a position at which deceleration from the constant speed starts.

The deceleration start point is set at the end of a data division. Since a gap is placed between the data division and each ID division, deceleration may start earlier by the length of the gap.

In this embodiment, similarly to the first embodiment, the drive time for the optical card 1 can be shortened by d1 out of the time required for increasing the speed of the optical card 1 to a constant speed.

FIG. 14a shows a drive pattern in the third embodiment of the present invention according to which the optical card 1 is driven once. FIG. 14a shows, similarly to FIG. 13a, the time-passing transition of a speed. Portions identical to those in FIG. 13a bear the same reference numerals. What differs from the drive pattern in the second embodiment is a position at which the optical card 1 lying at a stop position is accelerated to move at a constant speed. In the third embodiment, the relative speed is made constant before a light beam from the optical head 21 reaches an ID division. After access to the ID divisions and data division 5 is completed, deceleration is performed similarly to that in the second embodiment. FIG. 14b is, like FIG. 13a, an explanatory diagram showing the aforesaid prior art for comparison.

Since the optical card 1 is driven as mentioned above, once a constant speed is attained, all ID fields in an ID division can be read at the constant speed. Unlike the first and second embodiment, the third embodiment can identify a track address without reading ID divisions from multiple tracks at the same time. This embodiment, similarly to the second embodiment, offers a smaller slowing-down acceleration constant at the rate of which the optical card 1 is decelerated from a constant speed. An apparatus of this embodiment is therefore unsusceptible to external vibrations or shocks applied during deceleration, and generates less vibrations.

The present invention will not be limited to the aforesaid embodiments, but may be modified in various modes. A VCM is employed for reciprocating an optical card. Alternatively, the rotation of a rotary motor may be converted into linear movement using a belt, wire, or other driving mechanism in order to drive the shuttle 23. The regenerating optical system uses a cylindrical lens to produce an elongated beam. Alternatively, LEDs may be used to circularly illuminate multiple tracks, so that data will be read from the multiple tracks. The focus detecting method or track detecting method may be replaced with other method. As for reading an ID division, majority operation is performed on the quintuple data subjected to error correction. Error correction may not be performed, but a cyclic redundancy check (CRC) code offering a high error detecting capability may be used exclusively for error detecting.

In the present invention, it will be apparent that a wide range of different embodiments can be formed on the basis of the scope of the invention. This invention will be limited to the appended claims but not restricted to any specific embodiments.

What is claimed is:

1. An optical card recording/regenerating apparatus, comprising:
   an optical head for irradiating light spots to perform at least either information recording or regenerating on an optical card including a plurality of tracks each of which has ID divisions containing track address information at both ends thereof and a data division between said ID divisions;

a driving means for moving said optical card and said optical head relatively to each other; and a control means for controlling said driving means so that said optical card and said optical head will be reciprocated relatively to each other, said control means also for controlling said driving means so that the relative speed between said optical head and said optical card will increase or decrease over at least part of said ID divisions, and become constant over the remaining part of said ID divisions and said data division, thus achieving at least either information recording or regenerating.

2. An optical card recording/regenerating apparatus according to claim 1, wherein said control means controls said driving means so that the relative speed between said optical head and said optical card will be constant over said data division and part of said ID divisions, thus achieving at least either information recording or regenerating.

3. An optical card recording/regenerating apparatus according to claim 1, wherein said control means controls said driving means so that the relative speed between said optical head and said optical card will be constant over part of one of said ID divisions, the whole of the other ID division, and said data division, thus achieving at least either information recording or regenerating.

4. An optical card recording/regenerating apparatus according to claim 1, wherein said control means controls said driving means so that the relative speed between said optical head and said optical card will be constant over said data division and part of one of said ID divisions, thus achieving at least either information recording or regenerating.

5. An optical card recording/regenerating apparatus according to claim 1, wherein said control means controls said driving means from part of a plurality of track address information contained in at least one of said ID divisions to said data division so that the relative speed between said optical head and said optical card will be constant, in order to perform at least either information recording or regenerating on said optical card that includes ID divisions containing a plurality of track address information.

6. An optical card recording/regenerating apparatus according to claim 5, further including:

a means for reading information from tracks on said optical cards; and a determining means for determining whether or not a plurality of track address information, which has been read from the same track by said reading means when said relative speed becomes constant, is consistent.

7. An optical card recording/regenerating apparatus according to claim 1, wherein said control means controls said driving means so that the relative speed between said optical head and said optical card will increase or decrease during any duration except the one during which said relative speed is controlled to be constant.

8. An optical card recording/regenerating apparatus according to claim 1, further including a length detecting means for detecting a length along tracks on said optical card; said control means controlling the speed of said driving means according to the length detected by said length detecting means.

9. An optical card recording/regenerating apparatus according to claim 1, further including:

a means for reading information from n tracks (where, n is an integer 2 or larger than 2) simultaneously when said relative speed becomes constant; and a track address fixing means that fixes a track address of a specific one of the tracks, from which said reading means reads information, on a basis of the track address information of at least two tracks read by said reading means.

10. An optical card recording/regenerating apparatus according to claim 8, wherein said track address fixing means includes a determining means that computes said read track address information on a basis of a difference in the number of tracks between at least two tracks, from which said track address information has been read, and the number of said specific tracks, and determines whether or not the results of the computation are consistent.

11. An optical card recording/regenerating apparatus, comprising:

an optical head for irradiating light spots to perform at least either information recording or regenerating on an optical card including a plurality of tracks each of which has ID divisions containing track address information in the vicinities of both ends thereof, and a data division between said ID divisions;

a driving means for moving said optical card and said optical head relatively to each other; and a control means for controlling said driving means so that said optical card and said optical head will be reciprocated relatively to each other, and controlling said driving means so that the relative speed between said optical head and said optical card will become constant over said data division, and then decrease over at least part of said ID divisions.

12. A recording/regenerating method for an optical card recording/regenerating apparatus, comprising:

a procedure in which when an optical card, which includes a plurality of tracks each having ID divisions containing track address information at both ends thereof and a data division between said ID divisions, is to be moved with respect to an optical head in an optical card recording/regenerating apparatus, said optical card is driven so that the relative speed between said optical head and said optical card will increase or decrease over at least part of said ID divisions and become constant over the remaining part of said ID divisions and said data division;

a procedure in which track address information is read from an ID division in which the relative speed between said optical head and said optical card is constant; and a procedure in which at least either information writing or reading is performed on said data division.

13. A recording/regenerating method for an optical card recording/regenerating apparatus according to claim 12, further including:

a procedure in which it is determined whether the relative speed between said optical head and said optical card is constant; and a procedure in which after it is determined in said determining procedure that said relative speed is constant, track address information is read from said ID division.

14. A recording/regenerating method for an optical card recording/regenerating apparatus according to claim 12, further including:
   a procedure in which the relative speed between said optical head and said optical card is increased before and after a duration in said driving procedure during which driving is done to make said relative speed constant; and
   a procedure in which said relative speed is decreased.

15. A recording/regenerating method for an optical card recording/regenerating apparatus according to claim 12, further including a procedure in which before said relative speed is made constant in said driving procedure, said relative speed is increased over one of the edges of said optical card through part of one of said ID divisions.

16. A recording/regenerating method for an optical card recording/regenerating apparatus according to claim 12, further including a procedure in which after said relative speed is made constant in said driving procedure, said relative speed is decreased over part of said the other ID division through the other edge of said optical card.

17. A recording/regenerating method for an optical card recording/regenerating apparatus according to claim 12, wherein said reading procedure includes:
   an information reading procedure in which information is read from tracks on an optical card having a plurality of track address information in said ID divisions:
   a determining procedure in which it is determined whether a plurality of track address information in the same track, which has been read in said information reading procedure, is consistent; and
   a procedure in which a track address of a current track is identified by the track address information which has been determined to be consistent in said determining procedure.

18. A recording/regenerating method for an optical card recording/regenerating apparatus according to claim 12, wherein said reading procedure includes:
   a multiple track reading procedure in which information is read from a plurality of tracks on said optical card:
   a determining procedure in which computation is performed on each of track address information of different tracks which has been read in said multiple track reading procedure, and then it is determined whether the obtained information is consistent; and
   a procedure in which a track address of a current track is identified by the information that has been determined to be consistent in said determining procedure.

19. A recording/regenerating method for an optical card recording/regenerating apparatus according to claim 17 or 18, wherein said identifying procedure includes:
   a procedure in which it is determined whether the track address of a current track, which has been identified in said identifying procedure, indicates an intended track; and
   a procedure in which if it is determined in said determining procedure that the track address indicates an intended track, at least information recording or regenerating is performed on said data division.

* * * * *